Dec. 11, 1928.
C. N. MONTEITH
1,694,483
RETRACTABLE LIGHT FOR AIRCRAFT
Filed May 14, 1928
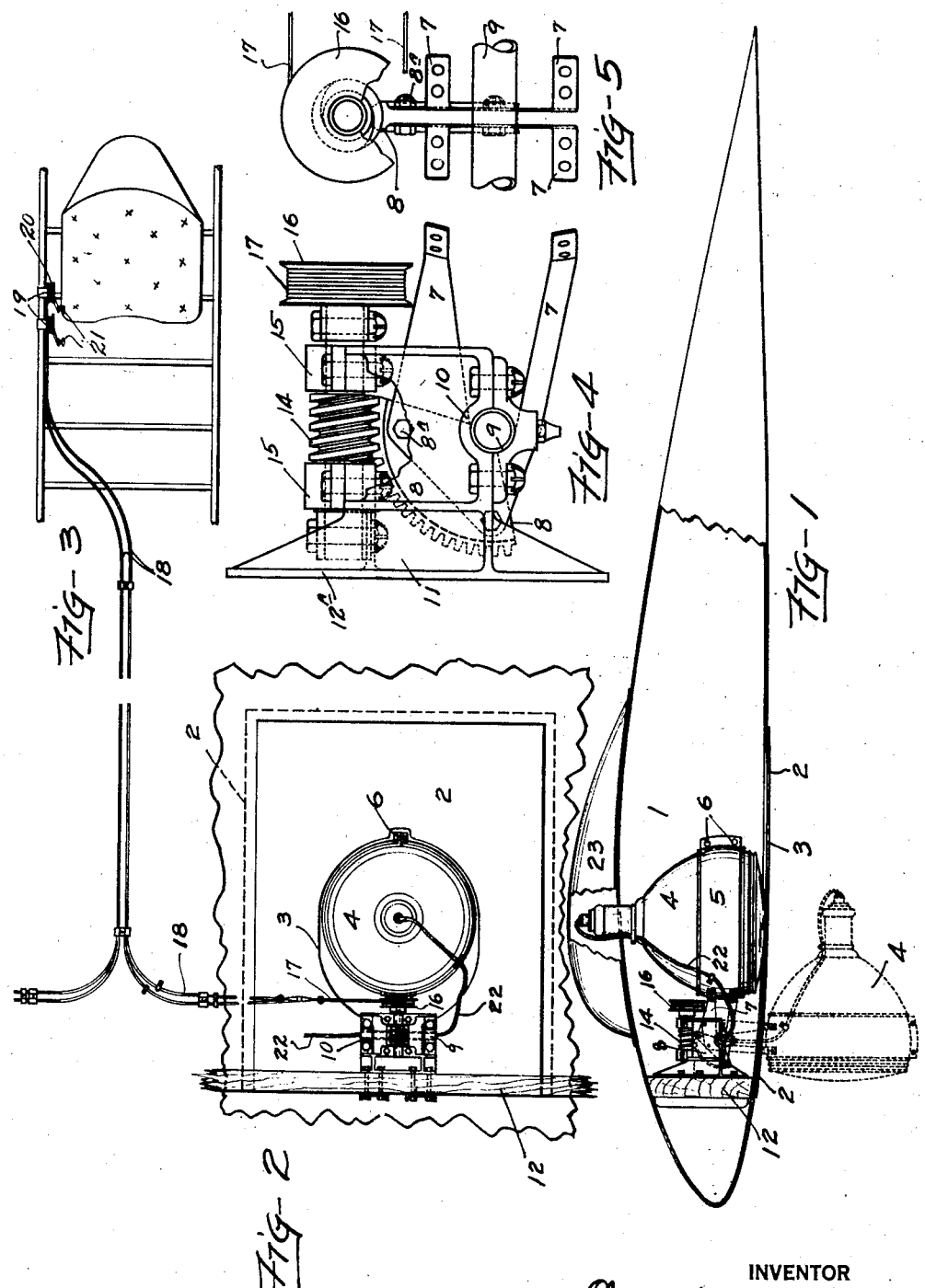
INVENTOR
Charles Morton Monteith Patented Dec. 11, 1928.

1,694,889

UNITED STATES PATENT OFFICE.

CHARLES NORTON MONTEITH, OF SEATTLE, WASHINGTON, ASSIGNOR TO BOEING AIRPLANE COMPANY, OF SEATTLE, WASHINGTON.

RETRACTABLE LIGHT FOR AIRCRAFT.

Application filed May 14, 1928. Serial No. 277,531.

This invention is directed to landing lights, navigation lights, and the like for aircraft, and more especially to a retractable light which is swingably operable from within any of the principal structures of an airplane, and controllable from the operator's compartment, wherefrom the light, when not in use, can be quickly and conveniently drawn into a cavity formed, for example in the wing, to receive it, and which cavity when thus occupied is partially sealed by the lens of the light. The light thus hidden from the air rush incident to flight eliminates what would otherwise be parasite resistance with its imminent drag forces. Thus, having all lights operatively concealed, within the streamline structure of the airplane, the speed of the airplane is not lessened, except during the exposure of the lights.

Applicant has found by actual experiment that a pair of standard landing lights, rigidly fixed to the wings of a certain airplane decreased the speed of that particular airplane to the extent of 3.85 miles an hour.

Another feature of the invention is that the landing lights when retracted are in a position for projecting the light rays downwardly, and thus may be useful in sighting landmarks, roadways, rivers and the like, for directional guidance while flying at night.

Another object of the invention is to provide a device of this character which is of simple, efficient, durable and inexpensive construction, wherein the several parts are readily accessible.

These and other objects will appear as my invention is more fully hereinafter described in the following specification, illustrated in the accompanying drawings, and finally pointed out in the appended claim.

In the drawings

Figure 1 is a sectional end elevation of a wing member showing my improved form of retractable light in operative engagement therewith.

Fig. 2 is a plan view of Figure 1 with the wing removed for convenience in illustration, showing the light and its related parts secured to a fragment of a wing beam.

Fig. 3 is a fragmentary plan view of that part of a fuselage of an airplane forming the cockpit, and showing the light controlling cables extending from controls in the cockpit to the light.

Fig. 4 is an enlarged side elevation of the actuating means for the light.

Fig. 5 is an end elevation of the device projected from Figure 4.

Referring now more particularly to the drawings, in the present embodiment of the invention, I have shown a light housing or compartment, formed within an airplane wing as indicated at 1, and as there might be a plurality of wings and lights, and as all of the lights and their controlling mechanisms would be identical with each other, a description of one will suffice for all. In the present instance, a landing light is carried by each lower wing within the compartment, which is provided with a rigid cover plate 2, constituting a section of the airplane exterior shell disposed around said compartment. The plate is apertured as at 3 to permit passage of a light 4, inwardly and outwardly of said compartment. The light is embraced and carried by a collar 5, securely clamped thereto by means of bolts 6. The collar is carried by a pair of arms 7 which are secured to a gear segment 8, by means of bolts 8^A. The gear segment is mounted to a hollow shaft 9 which is rotatably mounted within a pair of bearings 10 formed in a main body member 11 which is mounted to a wing beam 12, by means of a flange portion 12^A. Operatively engaged with said gear segment is a worm gear 14 rotatably mounted within a pair of bearings 15 in said main body member and at right angles to the other bearings 10. The shaft carrying said worm gear extends beyond said bearings 10, and is provided with a cable drum 16 from which extends an endless operating cable 17, thru tubular housings 18, leading to, and directing the operating cables from the drum cable to the controls 19 within the cockpit of the airplane, and which controls consist of cable drums 20, and handles 21 therefor. Each light has its respective operating cable drum and handle, and in Figures 2 and 3 is shown two sets of control cables, one set, as described, leading to the light in the left wing, and the other to a light in the right wing. As previously stated, any number and type of lights may be employed, and each operated from the cockpit. 22 indicates an electrical circuit, extending from the light 4, thru the hollow shaft 9 and thence to a source of electrical energy (not shown in the drawings). The length of the light shown, exceeds the camber of the wing and a streamline cover 23 is provided. But it is to be understood that other lights of smaller size or special design could be employed to be entirely housed within the compartment.

From the foregoing, it can be readily seen that when the cable drum 20, in the cockpit, is rotated, a corresponding rotary movement will be imparted to the cable drum 16 and the worm gear 14, with a resultant upward or downward movement of the arms 7 and the light 4.

While I have shown a particular form of embodiment of my invention, I am aware that many minor changes therein will readily suggest themselves to others skilled in the art without departing from the spirit and scope of the invention.

Having thus described my invention: what I claim as new and desire to protect by Letters Patent is:

An airplane wing of usual streamline formation, a compartment formed therein adjacent to the wing beam near the leading edge of said wing, an apertured and rigid cover plate for said compartment, a light swingably mounted to said wing beam, means for causing radial movement of said light through said cover plate, said means including a worm gear and gear segment, said worm gear being rotatable by means of control cables extending therefrom to the cockpit of the airplane, said gear segment being mounted to a hollow shaft and carrying said light by means of a bracket, an electrical circuit embracing said light and extending thru said hollow shaft thence to an electric source of energy.

In testimony whereof I affix my signature.

CHARLES NORTON MONTEITH.